United States Patent
Maanoja

(10) Patent No.: US 7,116,990 B2
(45) Date of Patent: Oct. 3, 2006

(54) QUALITY BASED LOCATION METHOD AND SYSTEM

(75) Inventor: Markus Maanoja, Helsinki (FI)

(73) Assignee: Nokia Corporation, Espoo (FI)

( * ) Notice: Subject to any disclaimer, the term of this patent is extended or adjusted under 35 U.S.C. 154(b) by 70 days.

(21) Appl. No.: 10/480,450

(22) PCT Filed: Jun. 29, 2001

(86) PCT No.: PCT/EP01/07465

§ 371 (c)(1),
(2), (4) Date: Dec. 12, 2003

(87) PCT Pub. No.: WO03/005750

PCT Pub. Date: Jan. 16, 2003

(65) Prior Publication Data

US 2004/0185865 A1    Sep. 23, 2004

(51) Int. Cl.
*H04Q 7/20*    (2006.01)
(52) U.S. Cl. .................. 455/456.2; 455/456.1
(58) Field of Classification Search ............ 455/404.2, 455/433, 435.1, 452.2, 456.1, 456.2, 560, 455/3.01–3.06, 152.1, 345, 569.2; 340/426.2; 700/94
See application file for complete search history.

(56) References Cited

U.S. PATENT DOCUMENTS

| | | | |
|---|---|---|---|
| 6,002,936 A * | 12/1999 | Roel-Ng et al. | 455/456.4 |
| 6,169,899 B1 * | 1/2001 | Havinis et al. | 455/433 |
| 6,198,935 B1 * | 3/2001 | Saha et al. | 455/456.2 |
| 6,385,458 B1 * | 5/2002 | Papadimitriou et al. | 455/456.2 |
| 2001/0009857 A1 * | 7/2001 | Vanttinen | 455/456 |

FOREIGN PATENT DOCUMENTS

| | | |
|---|---|---|
| EP | 0 905 992 A1 | 3/1999 |
| WO | WO 96/25830 | 8/1996 |
| WO | WO 99/11085 | 3/1999 |
| WO | WO 99/46949 | 9/1999 |

* cited by examiner

*Primary Examiner*—William Trost
*Assistant Examiner*—James D Ewart
(74) *Attorney, Agent, or Firm*—Squire, Sanders & Dempsey L.L.P.

(57) ABSTRACT

The present invention relates to a method for locating a wireless terminal device in a cellular network in response to a location request, wherein a quality information is added to the location request in order to define a requested quality of service. Based on the quality of service, a suitable place or network element for determining the location is selected. Thereby, a load sharing model can be provided such that the calculation capacity can be distributed and the signaling load reduced.

20 Claims, 3 Drawing Sheets

QUALITY BASED LOCATION METHOD AND SYSTEM

FIELD OF THE INVENTION

The present invention relates to a location method and system for locating a wireless terminal device in a cellular network.

BACKGROUND OF THE INVENTION

Location systems utilize one or more positioning mechanisms in order to determine the location of a terminal device, such as a mobile station, a user equipment or any other kind of radio terminal. Positioning a target terminal device involves signal measurements and a location estimate computation based on the measured signals. In general, a location or position estimate provides the geographic location of a mobile station and/or a valid mobile equipment, expressed in latitude and longitude data. The location estimate can be represented in a predetermined universal format.

Positioning mechanisms for location systems (LCS) in a GSM (Global System for Mobile communication) cellular system may be based on an uplink time of arrival (TOA) mechanism, Observed Time Difference (OTD) mechanisms (e.g. OTDOA or Enhanced OTD (E-OTD)), a Global Positioning System (GPS) assisted mechanism, cell identity (CI) based mechanisms, HLR (Home Location Register) or VLR (Visitor Location Register) queries, or any combination thereof. As a fall-back procedure, a Timing Advance (TA) parameter can be used to assist all above positioning mechanisms, except HLR/VLR based positioning. The TA value is usually known for the serving base transceiver station (BTS) to obtain TA values in case the concerned mobile station is in an idle mode. A special call not noticed by the user or subscriber of the mobile station is set up by using a paging procedure, e.g. not actually a call, and the cell identity (CI) of the serving cell and the TA is returned in response to this call.

In GSM, according to the uplink TOA positioning method, the time of arrival (TOA) of a known signal sent from the mobile station and received at three or more measuring units is measured. The known signal is an access burst generated by having the mobile station perform an asynchronous handover. The method requires an additional measurement unit hardware, i.e. a location measurement unit (LMU), in the network at the geographical vicinity of the mobile station to be positioned to accurately measure the TOA of the bursts. Since the geographical coordinates of the measurement units are known, the position of the mobile station can be calculated at a central location center via hyperbolic triangulation.

Furthermore, the E-OTD method is based on measurements in the mobile station of the enhanced observed time difference of arrival of bursts of nearby pairs of BTSs. To obtain an accurate triangulation, E-OTD measurements are needed for at least three distinct pairs of geographically dispersed BTSs. Based on the measured E-OTD values, the location of the mobile station can be calculated either in the network or in the mobile station itself, if all the needed information is available in the mobile station.

The GPS method refers to any of several variants that make use of GPS signals or additional signals derived from the GPS signals in order to calculate the position of the mobile station.

The location system is logically implemented in a cellular network through the addition of a network node, the Mobile Location Center (MLC). In particular, a Gate-way Mobile Location Center (GMLC) is provided, which is the first node which an external client accesses in the cellular network. The GMLC requests routing information from the Home Location Register (HLR), performs registration authorization and sends positioning request to and receives final location estimates from the network. Furthermore, a Serving Mobile Location Center (SMLC) is provided which manages the overall coordination and scheduling of resources required to perform positioning or location of a mobile or wireless terminal device. It also calculates the final location estimate and accuracy. In one cellular network, there may be more than one SMLC and GMLC.

A so-called NSS based SMLC supports positioning of a target mobile station via signaling to the visited Mobile Switching Center (MSC), while a so-called BSS based SMLC supports positioning via signaling to the Base Station Controller (BSC) serving the target mobile station. Both types of SMLC may support an interface to enable access to information owned by another SMLC.

The SMLC controls a number of LMUs for the purpose of obtaining radio interface measurements to locate or help locate mobile station subscribers in the area that it serves. The signaling between an NSS based SMLC and an LMU is transferred via the MSC serving the LMU, while the signaling between a BSS based SMLC and an LMU is transferred via the BSC that serves or controls the LMU.

The SMLC and GMLC functionality may be combined in the same physical node, combined in existing physical nodes, or reside in different nodes of the cellular network.

A more detailed description of the known location systems is disclosed in the GSM specification 03.71.

Document EP 0 905 992 A1 discloses a position location procedure where location requests are delivered to mobile terminals. A decision unit at the mobile terminals is arranged to measure the quality level of received radio signals and to switch to a special position location function when the measured quality level falls below a set level. Thereby, the position location procedure depends on the receiving quality of the radio signals and a high probability of success can be achieved In the above conventional location systems, each location request generates a considerable amount of load to signaling, location calculation and measurement functions of the network. Therefore, enough signaling capacity and centralized calculation and/or measurement capacity has to be provided in the network for LCS purposes. However, current LCS architectures are no longer able to cope with the desired amount of location requests per second as defined by operator requirements.

SUMMARY OF THE INVENTION

It is therefore an object of the present invention to provide a location method and a system by means of which the network capacity for location requests can be increased.

This object is achieved by a method for locating a wireless terminal device in a cellular network in response to a location request, the method comprising the steps of:

adding a quality information to the location request, the quality information defining a requested quality of service;

checking the quality information on the transmission path of the location request to the cellular network; and selecting based on the quality information a network element where the location of the wireless terminal device is to be determined.

Although quality requirements are already considered in current location procedures, they are used only in local method selections. In practice, this means that QoS is used only in BSS or NSS architectures to select the used method. In contrast thereto, according to the present invention, the method selection logic may be distributed all over the network i.e. GMLC (HLR and VLR area based positioning, MSC (BSC based positioning), BSC (CI based positioning, additionally in some cases E-OTD & GPS) and MS (MS based E-OTD and GPS). In this way, the calculation can be done in the optimal device regarding requested accuracy and used network resources.

Furthermore, the above object is achieved by a network element for routing a location request to a determination network element where the requested location of a wireless terminal is determined, the network element comprising:

checking means for checking a quality information added to the location request, the quality information defining a requested quality of service; and selecting means for selecting the determination network element based on the quality information.

Additionally, the above object is achieved by a system for locating a wireless terminal device in a cellular network in response to a location request, the system comprising:

a service function for adding a quality information to the location request; and a network element for selecting based on the quality information a network element where the location of the wireless terminal device is determined, and for routing the location request to the selected network element;

wherein said selected network element is arranged to receive the location request and to determine the location in response to the location request.

Accordingly, the current centralized location architecture is improved by distributing the calculation capacity of the location system. Furthermore, location requests can be terminated as early as possible according to the quality of service (QoS) required by the location service. The location can be calculated in several places or network elements and does not have to be necessarily always routed to the radio access network. Thereby, the signaling load is reduced, since some of the location requests can be served at an earlier place in the network and do not have to be routed all the way to the radio access network. The distribution of the calculation leads to a reduced calculation load per concerned network element.

Preferably, the requested quality of service is used in the selection to derive a location method based on an accuracy and/or response time. indicated by the quality of service. Thus, location requests relating to a low accuracy and/or a fast response time do not have to be routed all the way to the radio access network, but can be dealt with already at the core network.

The location of the wireless terminal device may be determined in a network element of a core network if the quality information indicates a fast response time and a low accuracy. In particular, the network element may be a GMLC or an MSC, wherein the location may be determined by a positioning method based on a cell identity. In this case, the location may be determined by using a CAMEL function or a location information obtained from a HLR or VLR query Advantageous modifications or further developments of the invention are defined in the depended claims.

BRIEF DESCRIPTION OF THE DRAWINGS

In the following the present invention will be described in greater detail on the basis of a preferred embodiment with reference to the accompanying drawings, in which.

DESCRIPTION OF THE PREFERRED EMBODIMENT

The preferred embodiment will now be described based on an LCS architecture in which location requests are routed from an LCS client 40 to a GMLC 30 of the concerned core network.

Figure 1:
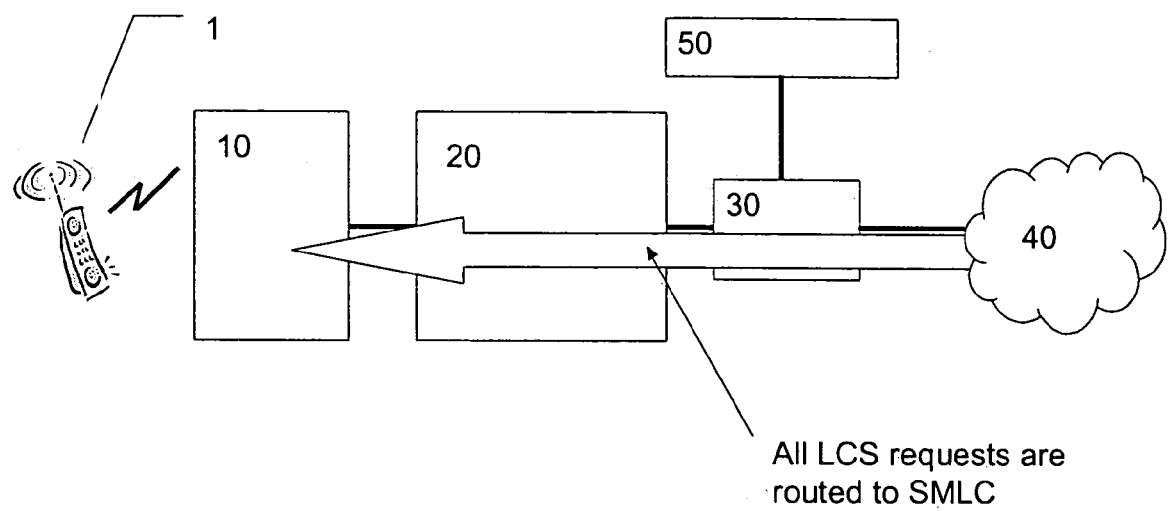
FIG. 1 shows a schematic block diagram of a conventional location system, where all location requests are routed to the ratio access network.

FIG. 1 shows a conventional type of such an LCS architecture in which all location requests received from the external LCS client 40 are routed by the GMLC 30 via a core network element 20, e.g. a second generation or third generation MSC of a GSM based core network or a second generation or third generation Serving GPRS Support Node (SGSN) of a GPRS (General Packet Radio Services) based core network, to a radio access network (RAN) 10 including an SMLC. The RAN 10 may be a GPRS RAN (GERAN) or a UMTS Terrestrial RAN (UTRAN). The routing of the GMLC 30 may be based on a query of a home subscriber database, e.g. a Home Subscriber server (HSS) 50. Thus, as indicated in FIG. 1, the location calculation is performed as a centralized function in the RAN 10.

However, it is very likely that most of the location services received from the external LCS client 40 can be fulfilled with limited accuracy (e.g. by a CI based determination), whereas only few services require more accurate methods needing actions at the concerned mobile terminal 1 or the RAN 10. Therefore according to the preferred embodiment, the load required for the location determination can be distributed according to the quality of service required by the locating service. To achieve this, a quality information is attached to the message requesting the location of a mobile terminal. The quality information may be added or attached to the location request message at the LCS client 40. The quality information may define or indicate the required QoS and can be used to select a suitable or the most suitable location method and thus the place where the location is to be determined or calculated.

Figure 2:
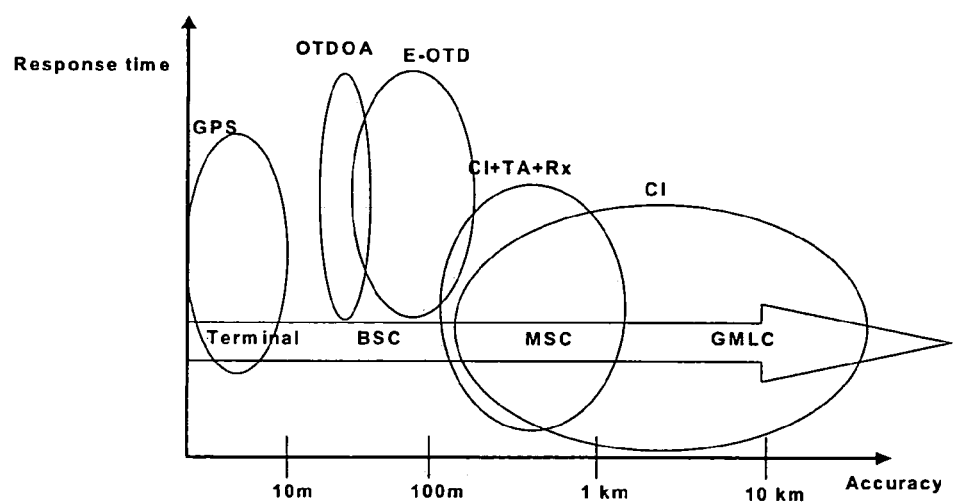
FIG. 2 shows a diagram indicating different location determination methods and their response time and accuracy.

FIG. 2 shows a diagram indicating different location determination methods based on their response time and accuracy. Furthermore, the arrow indicates at which place of the network the corresponding method can be performed. According to FIG. 2, the GPS-based location or positioning methods are performed at the mobile terminal 1 (or in BSC/RNC), while the OTD-based methods are performed at the Base Station Controller (BSC) (or mobile terminal) of the RAN 10. The CI-based methods can be performed at BSC/RNC, MSC or SGSN of the core network 20 or at the GMLC 30. VLR/HLR area positioning can be performed in GMLC. Furthermore, as can be gathered from the FIG. 2, a determination of the location with high accuracy (i.e. below about 100 m) is to be performed at the RAN 10, while a higher response time is required until the result is obtained. On the other hand, a determination of the location with low accuracy (i.e. more than about 100 m) can be performed at the core network, while a shorter response time can be achieved.

Thus, it is possible to decide on the handling of the location requests at the GMLC 30 or another suitable switching element of the core network, so as to route only those location requests to the RAN 10 which require a corresponding QoS, i.e. a high accuracy and/or a longer response time. It is therefore possible, to handle and calculate some of the location requests already in the GMLC 30 or the MSC or SGSN of the core network 20.

According to the preferred embodiment, the following load sharing model can be defined depending on the required QoS:

Type A QoS Requirement "Fast Response Time, Low Accuracy":

If the quality information added to the location request indicates this requirement, the CI-based or VLR/HLR area methods are most suitable. Therefore, the calculation can be done or initiated at the GMLC 30 or in an NSS based architecture (i.e. in an MSC or SGSN of the core network 20). The required location information may be requested by a camel (Customized Applications for Mobile network Enhanced Logic) function (e.g. ATI) or any other suitable method.

Type B QoS Requirement "High Accuracy, Long Response Time Accepted":

If this quality information is comprised in the location request, more advanced positioning methods are required. Therefore, the location request is routed to the RAN 10 where the required measurements and calculations are initiated.

It is very likely that most of the location requests are Type A QoS, which means that most of the location calculations can be done or initiated at the GMLC 30. Therefore, the calculation and signaling load in the RAN 10 can be reduced.

Figure 3:
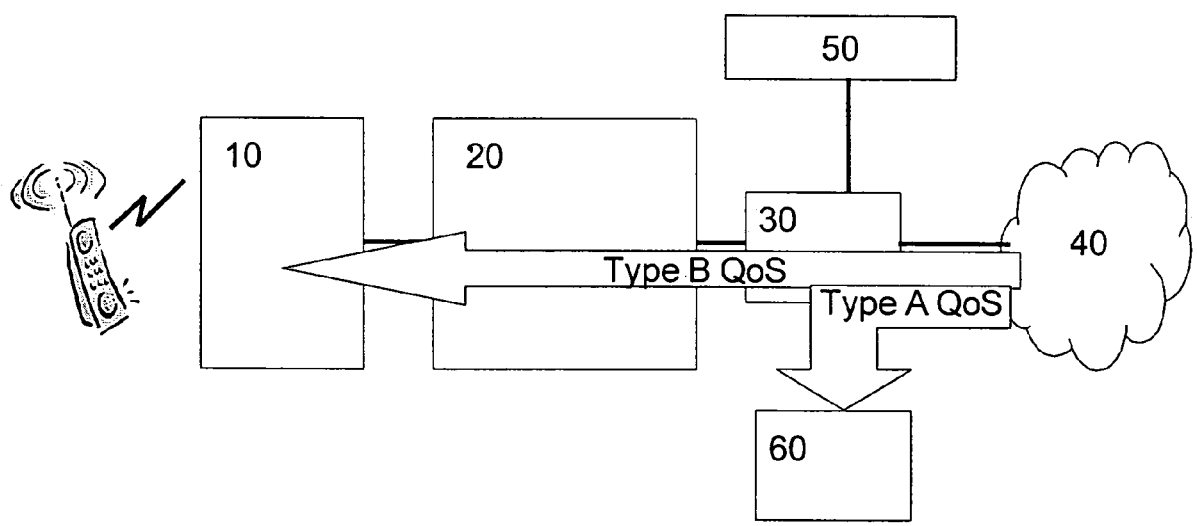
FIG. 3 shows a schematic block diagram of a location system according to the preferred embodiment.

FIG. 3 shows a schematic diagram of an LCS architecture according to the preferred embodiment. LCS requests issued from the LCS client 40 are routed to the GMLC 30. The LCS client 40 may contain an LCS combined with one or more clients, which by using location information can provide location-based services. In general, the LCS client 40 is a logical functional entity that requests a location information for one or more target mobile terminals or mobile stations within a specified set of parameters such as QoS. The LCS client 40 may reside in an entity within the cellular Network or in an entity external to the cellular network. The LCS 40 is arranged to add, incorporate or attach a quality information which indicates there requested QoS, and sends the location request to the GMLC 30. Then, a checking functionality at the GMLC 30 extracts and checks the quality information to determine a suitable place for the determination for the location. Based on the result of this checking operation, a selecting means provided at the GMLC 30 selects a suitable place for determination. This selection may as well be a selection between two networks 2G/3G (second generation/third generation).

Figure 4:
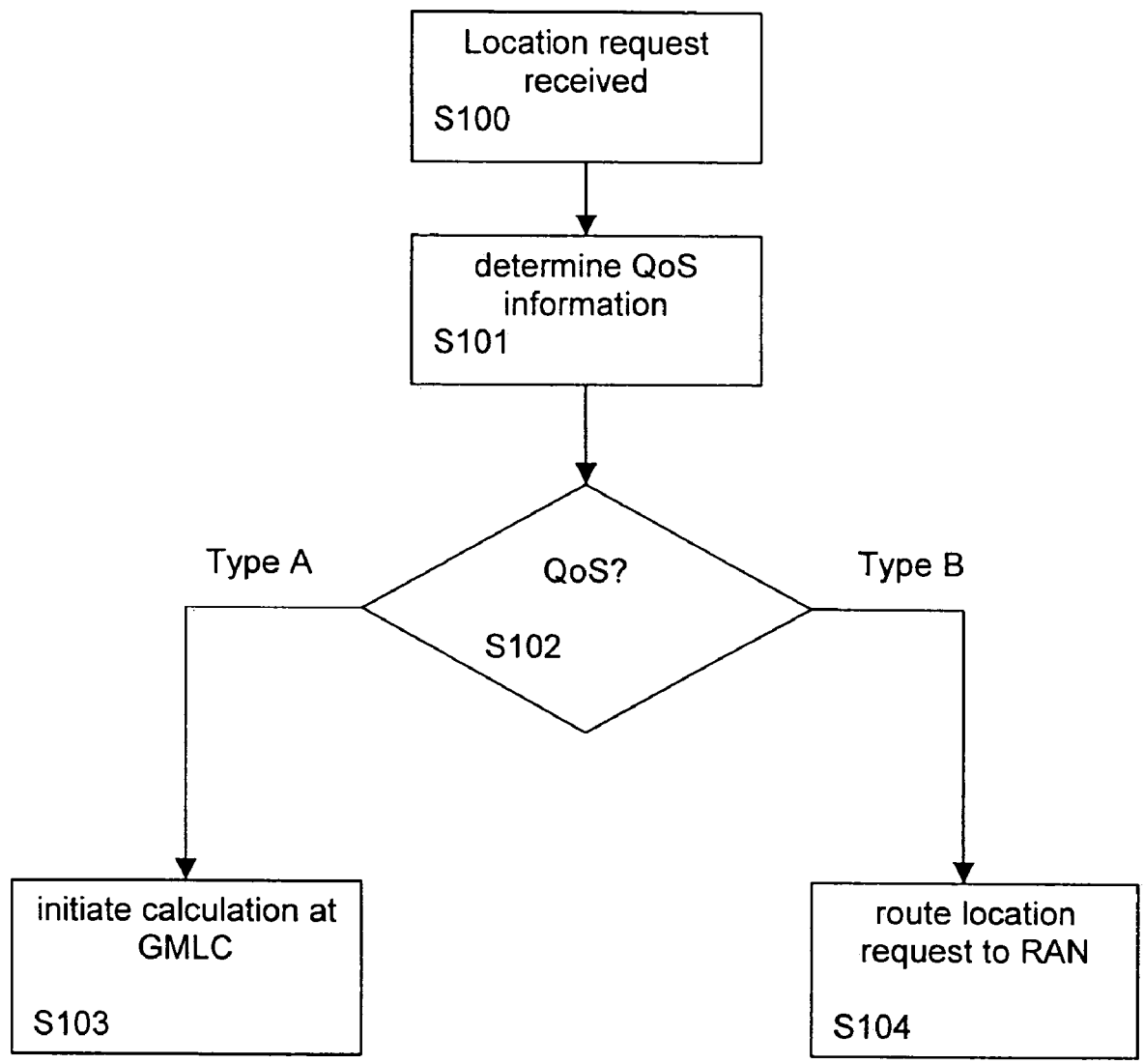
FIG. 4 shows a flow diagram indicating a processing of a location request according to the preferred embodiment.

FIG. 4 shows a flow diagram of the checking and selecting function provided at the GMLC 30. When a location request has been received in step S100, it is forwarded to the checking functionality where the kind of requested QoS is determined in step S101. Based on the indicated QoS, e.g. Type A QoS or Type B QoS, the procedure is branched in step S102. If a Type A QoS has been determined, the procedure is branched to S103, where the calculation or determination of the location is initiated at the GMLC 30 e.g. by routing the location request to a location server 60 which provides information required for the CI-based positioning method (or VLR/HLR area). On the other hand, if a Type B QoS has been determined, the procedure is branched to step S104, where the location request is routed by the GMLC 30 to the RAN 10 for providing a more accurate location.

It is noted that the checking or determination functionality and the selecting functionality may be implemented by corresponding routines of a control program controlling a processor provided at the GMLC 30, or may be implemented by corresponding discrete hardware functions of the GMLC 30.

Since most of the LSC requests are terminated as early as possible, the load generated to other network parts is minimized. Furthermore, the calculation load is distributed in the network, such that the calculation load per concerned network element is also reduced.

In case of dual mode terminals, restrictions regarding the simultaneous use of GSM and WCDMA/GPRS or other activities are provided. In practice, this means that WCDMA/GPRS connections are suspended if a mobile terminal is located or called via GSM. Therefore, the proposed quality based checking and selection may be performed to decide between the "native" locating or positioning method, e.g. CI based locating in WCDMA (Wideband Code Division Multiple Access), and an enhanced other system terminal locating method.

In particular, the GMLC 30 may receive a location request from the LCS client 40. This request includes for example the subscriber number of the user which is to be located and the QoS required. The QoS is stored in the GMLC 30 for further use. Then, the GMLC 30 makes a query to the home subscriber database 50, e.g. HLR, to find the correct network and core network element where the subscriber is served. The GMLC 30 may get a response from the home subscriber database 50 which indicates that the subscriber has an active connection to some non-GSM network (for example a WCDMA network). Additionally, the terminal is attached to the GSM network. First, "native" positioning methods are used, e.g. a location request is sent to the core network where the terminal is active. E.g., the GMLC 30 may forward the location request to the third generation (3G) core network. The core network uses the active signaling channel to forward the location request to the radio network, e.g. to an RNC (Radio Network Controller). The concerned radio network element performs the possible LCS related actions it is capable of. It should be noted that these actions may or may not fulfill the QoS requirements stated in the location request. The location estimate is returned to the core network with LCS parameters which may include terminal position coordinates, CI etc. Additionally, the response includes the achieved position estimate accuracy.

The core network forwards the estimate to the GMLC 30 which checks whether the requested QoS is met. If the QoS is not fulfilled, the GMLC 30 forwards the LCS request to an MSC (Mobile Switching Center) of the GSM network, which creates a signaling channel to the terminal and forwards the request to a serving BSC/SMLC. Now the BSC/SMLC has open a signaling channel to the terminal so that it can initiate LCS measurements. The SMLC calculates the terminal position based on E-OTD, A-GPS (Assisted GPS) or the like. The position estimate is returned to the MSC which forwards the new estimate to the GMLC 30. The GMLC 30 sends the most suitable position estimate to the LCS client 40.

Thereby, enhanced GSM positioning or location methods can be provided where appropriate. It should be noted that in case QoS is met the LCS procedure can be terminated when the first position estimate is received from the "native" positioning system. However, if QoS is not met the GMLC 30 may use the GSM network to enhance accuracy.

It is noted, that the present invention can be applied to any LSC architecture where a location request is routed via centralized network elements to specific location determination functions. Furthermore, it should be noted as well that the quality information (QoS) is not necessarily included in the original location request received by a GMLC from an LCS application. In this case, the concerned GMLC may add the quality information according to a determined dynamic network load and/or other predefined parameters. Moreover, the above fallback procedure to enhanced positioning or location methods may be performed to any other network system and is thus not intended to be restricted to a fallback to GSM. The present invention is therefore not restricted to the preferred embodiment described above, but may vary within the scope of the attached claims.

The invention claimed is:

1. A method for locating a wireless terminal device in a cellular network in response to a location request, said method comprising the steps of:
    adding a quality information to said location request, said quality information defining a requested quality of service;
    checking said quality information on the transmission path of said location request in said cellular network;
    selecting based on said quality information a network element at which the location of said wireless terminal device is calculated, said network element being selected from network elements of a core network and a radio access network of said cellular network.

2. A method according to claim 1, wherein said requested quality of service is used in said selection step to derive a positioning method based on an accuracy and/or response time indicated by said quality of service.

3. A method according to claim 1, wherein said location of said wireless terminal device is calculated in a network element of a core network if said quality information indicates a fast response time and a low accuracy.

4. A method according to claim 3, wherein said network element is GMLC or an MSC, and wherein said location is calculated by a locating method which is based on cell identity.

5. A method according to claim 4, wherein said location is calculated by using a CAMEL function or a location information obtained from a HLR or VLR query.

6. A method according to claim 1, wherein said location request of said wireless terminal device is routed to a radio access network of said cellular network, if said quality information indicates a high accuracy and a long response time accepted.

7. A network element, comprising:
    routing means for routing a location request to a determination network element where the location request where the location of a wireless terminal is calculated in response to the location request;
    checking means for checking a quality information added to said location request, said quality information defining a requested quality of service; and
    selecting means for selecting said determination network element based on said quality information, said determination network element being selected from network elements of a core network and a radio access network of said cellular network.

8. A network element according to claim 7, wherein said network element is a GMLC.

9. A network element according to claim 7, wherein said selecting means is configured to select a calculation at a GMLC or an MSC, if said quality information indicates a required fast response time and low accuracy of said location determination.

10. A network element according to claim 7, wherein said selecting means is configured to select a calculation at a radio access network, if said quality information indicates a required high accuracy and long response time accepted.

11. A network element according to claim 7, wherein said selecting means is configured to use said requested quality of service so as to derive a positioning method based on an accuracy and/or response time indicated by said quality of service.

12. A network element according to claim 7, wherein said network element is configured to route said location request to a radio access network of a cellular network, if said quality information indicates a required high accuracy and long response time accepted.

13. A system for locating a wireless terminal device in cellular network in response to a location request, said system comprising:
    a service function for adding a quality information to said location request;
    a network element for selecting based on said quality information a network element where the location of said wireless terminal device is to be calculated and for routing said location request to said selected network element, said selected network element being selected from network elements of a core network and a radio access network of said cellular network; and
    wherein said selected network element is configured to receive said location request and to calculate said location in response to said location request.

14. A system according to claim 13, wherein said network element is a GMLC configured to select either a location server of a core network of said GMLC or a radio access network serving said wireless terminal device.

15. A network element, comprising:
    a router configured to route a location request to a determination network element where the location request of a wireless terminal is calculated;
    a checking unit configured to check a quality information added to said location request, said quality information defining a requested quality of service; and
    a selecting unit configured to select said determination network element based on said quality information, said determination network element being selected from network elements of a core network and a radio access network of said cellular network.

16. A network element according to claim 15, wherein said network element is a GMLC.

17. A network element according to claim 15, wherein said selecting unit is configured to select a calculation at a GMLC or an MSC, if said quality information indicates a required fast response time and low accuracy of said location determination.

18. A network element according to claim 15, wherein said selecting unit is configured to select a calculation at a radio access network, if said quality information indicates a required high accuracy and long response time accepted.

19. A network element according to claim 15, wherein said selecting unit is configured to use said requested quality of service so as to derive a positioning method based on an accuracy and/or response time indicated by said quality of service.

20. A network element according to claim 15, wherein said network element is configured to route said location request to a radio access network of a cellular network, if said quality information indicates a required high accuracy and long response time accepted.

* * * * *